United States Patent
Beagen et al.

(10) Patent No.: US 7,744,007 B2
(45) Date of Patent: Jun. 29, 2010

(54) THERMOSTATIC MIXING VALVES AND SYSTEMS

(75) Inventors: Joseph W. Beagen, West Warwick, RI (US); Steve Goins, Warwick, RI (US)

(73) Assignee: Honeywell International Inc., Morristown, NJ (US)

( * ) Notice: Subject to any disclaimer, the term of this patent is extended or adjusted under 35 U.S.C. 154(b) by 1375 days.

(21) Appl. No.: 10/978,998

(22) Filed: Nov. 1, 2004

(65) Prior Publication Data

US 2006/0090798 A1    May 4, 2006

(51) Int. Cl.
*G05D 23/185* (2006.01)
(52) U.S. Cl. .............. 236/12.11; 236/12.12; 236/12.13; 236/12.14; 236/12.15; 236/12.16; 236/12.17; 236/12.18; 236/12.19; 236/12.2; 236/12.21; 236/12.22; 236/99 A; 236/99 J; 236/100; 137/337; 137/625.48; 137/625.5; 137/636.1
(58) Field of Classification Search ..... 62/12.11–12.22; 137/337, 625.48, 625.5, 636.1; 236/12.11–12.22, 236/93 A, 99 J, 100
See application file for complete search history.

(56) References Cited

U.S. PATENT DOCUMENTS

| | | | |
|---|---|---|---|
| 1,942,270 A | 1/1934 | Resek | |
| RE19,488 E | 3/1935 | Russell et al. | |
| 3,765,604 A | 10/1973 | Trubert et al. | |
| 3,792,812 A | 2/1974 | Knapp | |
| 3,929,283 A * | 12/1975 | Delpla | 236/12.2 |
| 4,029,256 A | 6/1977 | Dauga | |
| 4,249,695 A | 2/1981 | Dreibelbis | |
| 4,286,749 A | 9/1981 | Oguma | |
| 4,294,402 A | 10/1981 | Vollmer | |

(Continued)

FOREIGN PATENT DOCUMENTS

DE    3300600    7/1983

(Continued)

OTHER PUBLICATIONS

Honeywell TM 200/KB 191 (with exploded view of the Figure at the top right of p. 2 attached0, published prior to Sep. 4, 1997.

*Primary Examiner*—Frantz F Jules
*Assistant Examiner*—Azim Rahim
(74) *Attorney, Agent, or Firm*—Crompton Seager & Tufte LLC

(57) ABSTRACT

Thermostatic mixing valves and systems for mixing fluids of dissimilar temperature are disclosed. A thermostatic mixing valve in accordance with an illustrative embodiment of the present invention can include an elongated valve body defining a cold fluid inlet, a hot fluid inlet, a mix fluid outlet and a mixing chamber, a fluid flow regulator for adjusting the flow of cold and hot fluid injected into the mixing chamber, and temperature selection means for adjusting the temperature of fluid contained within the mixing chamber. The valve body may have a vertical, in-line configuration wherein the hot fluid inlet, mixing chamber, and mix fluid outlet are substantially axially aligned along a vertical longitudinal axis of the valve body, allowing hot fluid to pass substantially vertically through the valve body towards the mix fluid outlet. The thermostatic mixing valve can be provided as part of a water heater system to permit the water heater to operate at elevated temperatures, thereby increasing the capacity of hot water available to the system.

23 Claims, 6 Drawing Sheets

U.S. PATENT DOCUMENTS

| | | |
|---|---|---|
| 4,607,788 A | 8/1986 | Bendall et al. |
| 4,669,653 A | 6/1987 | Avelov |
| 4,863,097 A | 9/1989 | Avelov |
| 5,129,576 A | 7/1992 | Pullen et al. |
| 5,148,976 A | 9/1992 | Reid |
| 5,161,737 A | 11/1992 | Olmsted et al. |
| 5,203,496 A | 4/1993 | Kline |
| 5,323,960 A | 6/1994 | Kline |
| 5,340,018 A | 8/1994 | MacDonald |
| 5,341,987 A | 8/1994 | Ackroyd |
| 5,347,956 A | 9/1994 | Hughes |
| 5,379,936 A | 1/1995 | Kline |
| 5,462,224 A | 10/1995 | Enoki et al. |
| 5,551,630 A | 9/1996 | Enoki et al. |
| 5,572,985 A | 11/1996 | Benham |
| 5,701,387 A | 12/1997 | McGugan |
| 5,743,463 A | 4/1998 | Ueno et al. |
| 5,779,139 A | 7/1998 | Ueno |
| 5,806,761 A | 9/1998 | Enoki et al. |
| 5,988,514 A | 11/1999 | Huang |
| 6,042,015 A * | 3/2000 | Eveleigh et al. ........... 236/12.14 |
| 6,079,625 A | 6/2000 | Lebkuchner |
| 6,085,984 A * | 7/2000 | Chamot et al. ............. 236/12.2 |
| 6,119,947 A | 9/2000 | Couture et al. |
| 6,182,683 B1 * | 2/2001 | Sisk ........................... 137/337 |
| 6,250,559 B1 | 6/2001 | Knauss |
| 6,315,209 B1 | 11/2001 | Tripp |
| 6,315,210 B1 | 11/2001 | Kline |
| 6,318,638 B1 | 11/2001 | Banno et al. |
| 6,328,219 B1 | 12/2001 | Taylor et al. |
| 6,360,956 B1 | 3/2002 | Taylor et al. |
| 6,402,041 B2 | 6/2002 | Jelloul et al. |
| 6,536,464 B1 | 3/2003 | Lum et al. |
| 6,575,377 B1 | 6/2003 | Graves |
| 6,726,110 B2 | 4/2004 | Heinzelmann |
| 6,732,937 B2 | 5/2004 | Graves |
| 6,793,145 B2 | 9/2004 | Costa e Silva |
| 2003/0197065 A1 * | 10/2003 | Graves ....................... 236/12.2 |

FOREIGN PATENT DOCUMENTS

| | | |
|---|---|---|
| DE | 3614735 | 11/1987 |
| DE | 4123048 | 2/1992 |
| DE | 4423240 | 7/1994 |
| EP | 0000768 | 2/1979 |
| GB | 2096274 | 10/1982 |
| GB | 2275097 | 8/1994 |
| JP | 01288685 | 11/1989 |
| WO | 9530939 | 11/1995 |
| WO | 9732147 | 9/1997 |
| WO | 9616362 | 2/2007 |

* cited by examiner

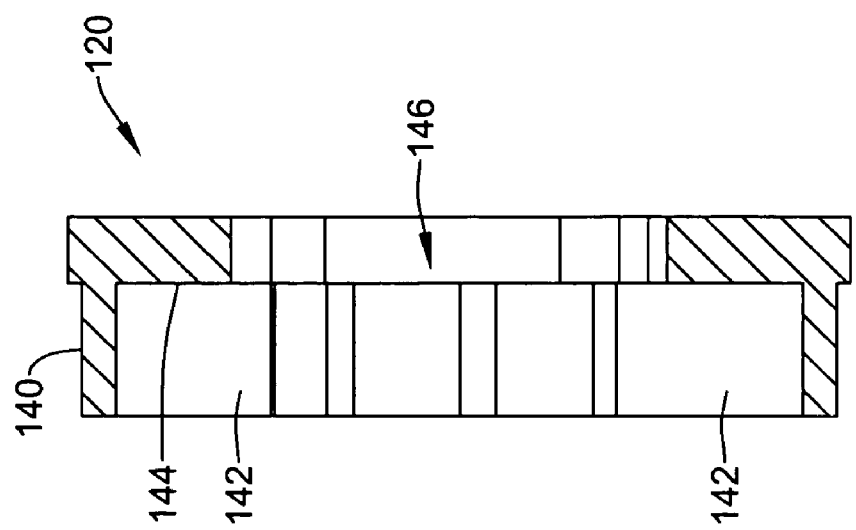
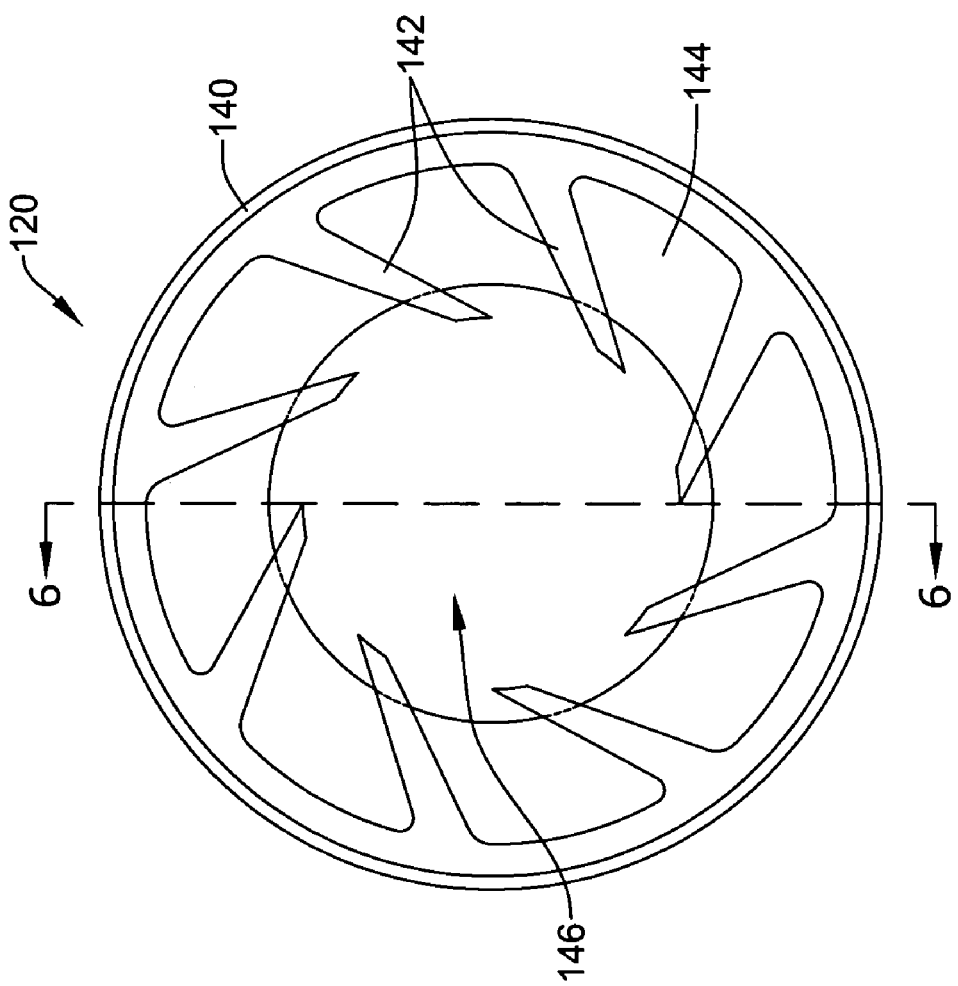

THERMOSTATIC MIXING VALVES AND SYSTEMS

FIELD

The present invention relates generally to the field of mixing valves. More specifically, the present invention pertains to thermostatic mixing valves and systems for mixing fluids of dissimilar temperature.

BACKGROUND

Water heaters are frequently used in supplying hot water to desired locations within a house, office building or other such structure. To regulate the temperature of water discharged by the water heater, a thermostatic mixing valve is typically connected to the hot water outlet of the water heater, allowing hot water discharged from the water heater to be mixed with cold water supplied to the structure in order to maintain a constant, pre-selected temperature. The tempered water discharged from the mixing valve can then be fed into the structure's hot water piping for use by the occupants. Such mixing valves are typically configured such that the temperature of the mixed water remains constant or nearly constant regardless of the temperature of hot and cold water supplied to the device, and regardless of the flow rate of hot and cold water supplied to the device.

With the construction of larger homes and an increased usage of hot water, the demand for water heaters having larger heating capacities has grown significantly. The demand for increased hot water capacity has also grown appreciably as a result of building codes and regulations (e.g. ASSE 1017) that limit the temperature of hot water that can be discharged from the water heater, affecting the ability of many water heaters to produce a sufficient volume of usable hot water. To overcome this limitation, many water heaters are configured to generate hot water at elevated temperatures greater than that desired or permitted by code, necessitating the use of a thermostatic mixing valve.

SUMMARY

The present invention pertains to thermostatic mixing valves and systems for mixing of fluids of dissimilar temperature. A thermostatic mixing valve in accordance with an illustrative embodiment of the present invention can include an elongated valve body defining a cold fluid inlet, a hot fluid inlet, a mix fluid outlet, and a mixing chamber; a fluid flow regulator for adjusting the flow of cold and hot fluid injected into the mixing chamber; and a temperature selection device for adjusting the temperature of fluid contained within the mixing chamber. The valve body may have a vertical, in-line configuration wherein the hot fluid inlet, mixing chamber, and mix fluid outlet are substantially axially aligned along a vertical longitudinal axis of the valve body, allowing hot fluid to pass substantially vertically through the valve body towards the mix fluid outlet. The cold fluid inlet can be configured to enter the mixing valve at an angle orthogonal to the longitudinal axis of the valve body, and can be equipped with an internal check valve to prevent the backflow of fluid through the cold fluid inlet. A recirculation inlet can also be provided in certain embodiments to permit the recirculation of fluid discharged from the mix fluid outlet, if desired.

The fluid flow regulator can be configured to regulate the flow of cold and hot fluid injected into the mixing chamber in order to maintain the temperature of fluid discharged from the mixing valve at a constant, pre-selected temperature. In certain embodiments, the fluid flow regulator may include a spool, a spring element, a piston stem, and a temperature-sensitive thermal element. In some embodiments, a diffuser can be provided to agitate fluid contained within the mixing chamber, resulting in a more accurate sensing of the average fluid temperature within the mixing chamber. In other embodiments, a bypass spring can be utilized to provide additional loading of the spool and spring element within the valve body, if desired.

The temperature selection device can include an adjustment mechanism and a movable collar operatively coupled to the fluid flow regulator. In certain embodiments, the adjustment mechanism may include an adjustment screw rotatably disposed within a side housing of the valve body and having a tapered section at one end adapted to engage a side opening of the collar. During operation, the adjustment screw can be rotated in either a clockwise or counterclockwise direction to adjust the axial positioning of the collar within the valve body, causing a corresponding increase or decrease in force exerted on the spring element by the piston stem. Such a change in the force exerted against the spring element causes the spool to move a certain distance between two inner surfaces of the valve body, thereby regulating the flow of cold and hot fluid allowed to pass into the mixing chamber.

The thermostatic mixing valve can be installed within a water heater system to regulate the temperature of hot water delivered to one or more fixture units within the system. A water heater system in accordance with an illustrative embodiment of the present invention may include a cold water supply, a water heater having a cold water inlet in fluid communication with the cold water supply and adapted to heat water to an elevated temperature, and a thermostatic mixing valve adapted to regulate the temperature of water discharged from the water heater at a constant, pre-selected temperature below that provided by the water heater.

BRIEF DESCRIPTION OF THE DRAWINGS

FIG. 5 is a top view of the illustrative diffuser of FIG. 4;

FIG. 6 is a cross-sectional view of the illustrative diffuser taken along line 6-6 of FIG. 5.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Figure 1:
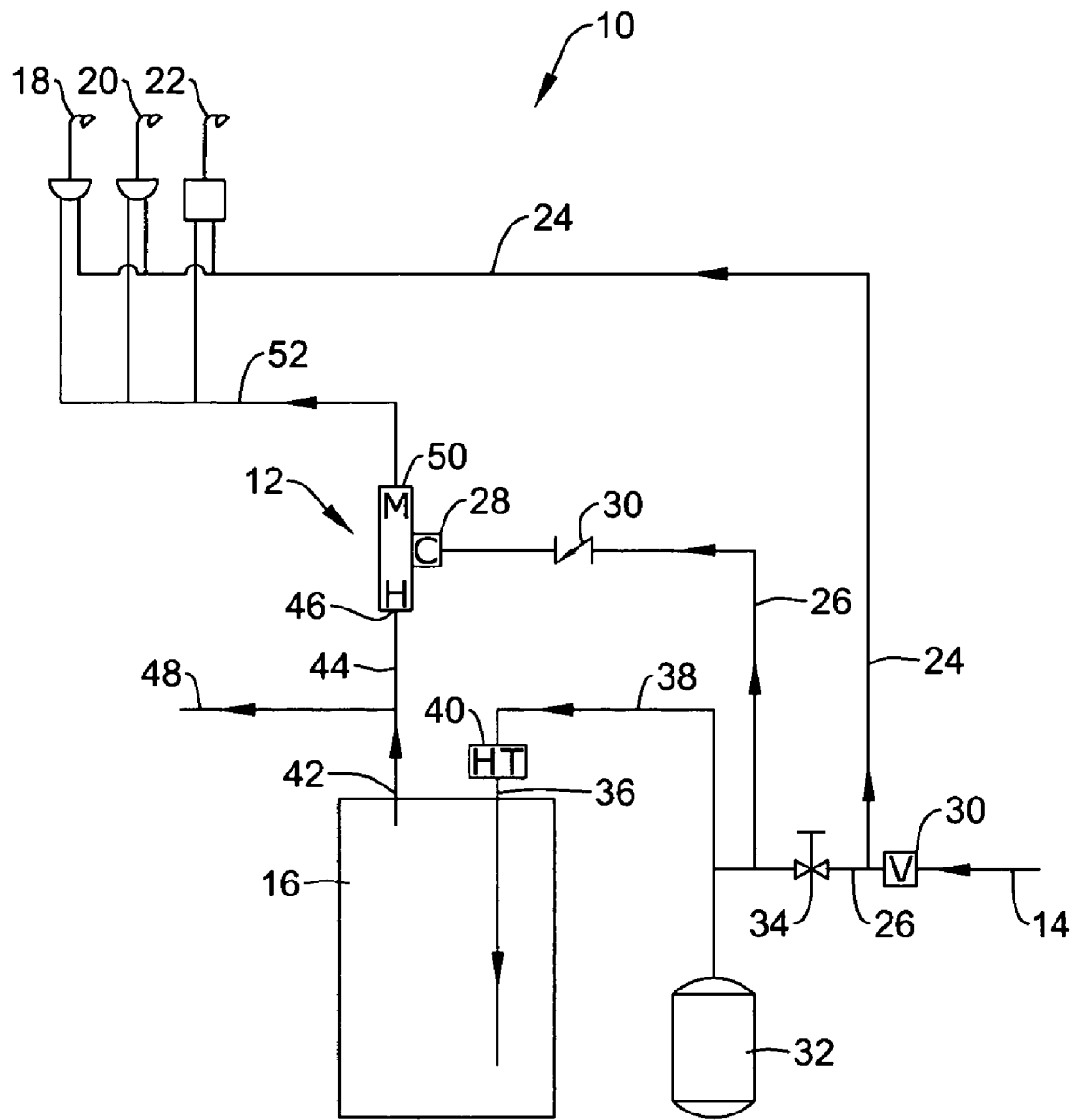
FIG. 1 is a schematic view showing an illustrative water heater system employing a thermostatic mixing valve in accordance with an exemplary embodiment of the present invention.

FIG. 1 is a schematic view showing an illustrative water heater system 10 employing a thermostatic mixing valve 12 in accordance with an exemplary embodiment of the present invention. As shown in FIG. 1, thermostatic mixing valve 12 can be installed within a water heater system 10 having a cold water supply 14, a water heater 16, and a number of fixture units 18,20,22 in fluid communication with the mixing valve 12, cold water supply 14, and water heater 16. Water heater system 10 may represent, for example, a residential water heater system adapted to deliver hot water to a number of fixture units such as a shower, bath, lavatory, faucet, clothes washer, dishwasher, or other such device wherein the delivery of tempered hot water is desired.

Cold water supplied by the cold water supply 14 can be delivered through a first pipe or conduit 24 for delivery directly to each of the fixture units 18,20,22 within the system 10. A second pipe or conduit 26 in fluid communication with a cold water inlet 28 of the mixing valve 12 and a check-valve 30, in turn, is used to supply cold water to the mixing valve 12 that can be mixed with hot water discharged from the water heater 16. A backflow preventer, check valve, pressure reducing valve, or other suitable means 30 for controlling backflow at the inlet of the cold water supply 14 can be provided to make the system 10 a closed system, if desired. In such embodiments, an expansion tank 32 can be provided in fluid communication with the water heater 16 to relieve any excess pressure within the water heater 16 and/or to prevent the discharge of water from the safety relief valve provided on many water heaters. A shut-off valve 34 can also be provided along the pipe or conduit 26 to permit the user to shut-off the supply of water delivered to the mixing valve 12 and/or water heater 16, if desired.

An inlet port 36 of the water heater 16 can be configured to receive cold water via a water heater inlet pipe 38 in fluid communication with pipe or conduit 26. If desired, the inlet port 36 of the water heater 16 can be equipped with an optional heat trap 40 for reducing convection currents at the inlet port 36 of the water heater 16 that can cause thermosyphoning of heat from the water heater 16.

An outlet port 42 of the water heater 16 can be configured to deliver hot water through pipe or conduit 44 and into a hot water inlet 46 of the mixing valve 12. The outlet port 42 of the water heater 16 will typically be located close to the hot water inlet 46 of the mixing valve 12 (e.g. $\leq 1$ ft) to reduce head and thermal losses through pipe or conduit 44. In certain embodiments, for example, the hot water inlet 46 of the mixing valve 12 can be coupled directly to the outlet port 42 of the water heater 16 using a threaded pipe fitting, union sweat connection, or other suitable connection means. If desired, a diverter pipe 48 in fluid communication with pipe or conduit 44 can be provided to divert some of the hot water discharged from the water heater 16 to other fixtures within the system 10 (e.g. a dishwasher) where temperature regulation via the mixing valve 12 may be undesired.

During operation, the mixing valve 12 can be configured to proportionately mix cold and hot water received at each of the water inlets 28,46, which can then be outputted as tempered water at a constant, pre-selected temperature through a mix water outlet 50 and hot water piping or conduit 52 in fluid communication with each of the fixture units 18,20,22. In certain applications, for example, the mixing valve 12 can be configured to output water at a constant or near constant mixed water temperature of about 120° F. while permitting the water heater 16 to operate at elevated temperatures in the range of about 120° F. to 180° F. Such an increase in the operating temperature of the water heater 16 can result in an increased amount of hot water capacity available for use. For a standard 80-gallon water heater, for example, such an increase in the operating temperature may result in an increase in the effective hot water capacity to a level similar to that of a 120-gallon water heater operating at a lower temperature of 120° F. It should be understood, however, that the mixing valve 12 and/or water heater 16 can be configured to operate at other temperature ranges, if desired.

While the illustrative mixing valve 12 of FIG. 1 is shown installed within a water heater system, it should be understood that the mixing valve 12 could be used in any number of applications wherein the control and regulation of fluids of dissimilar temperature is desired. Examples of other applications may include, but are not limited to, space and radiant heating applications, heat pump systems, hydronic heating applications, combo heating applications, industrial heating applications, photo processing applications, nursing home applications, greenhouse applications, and/or solar hot water applications. Moreover, in some embodiments such as space heating applications, for example, the mixing valve 12 can be configured to function as a diverting valve to permit the diversion of hot or cold water to particular fixtures within the system, if desired.

Figure 2:
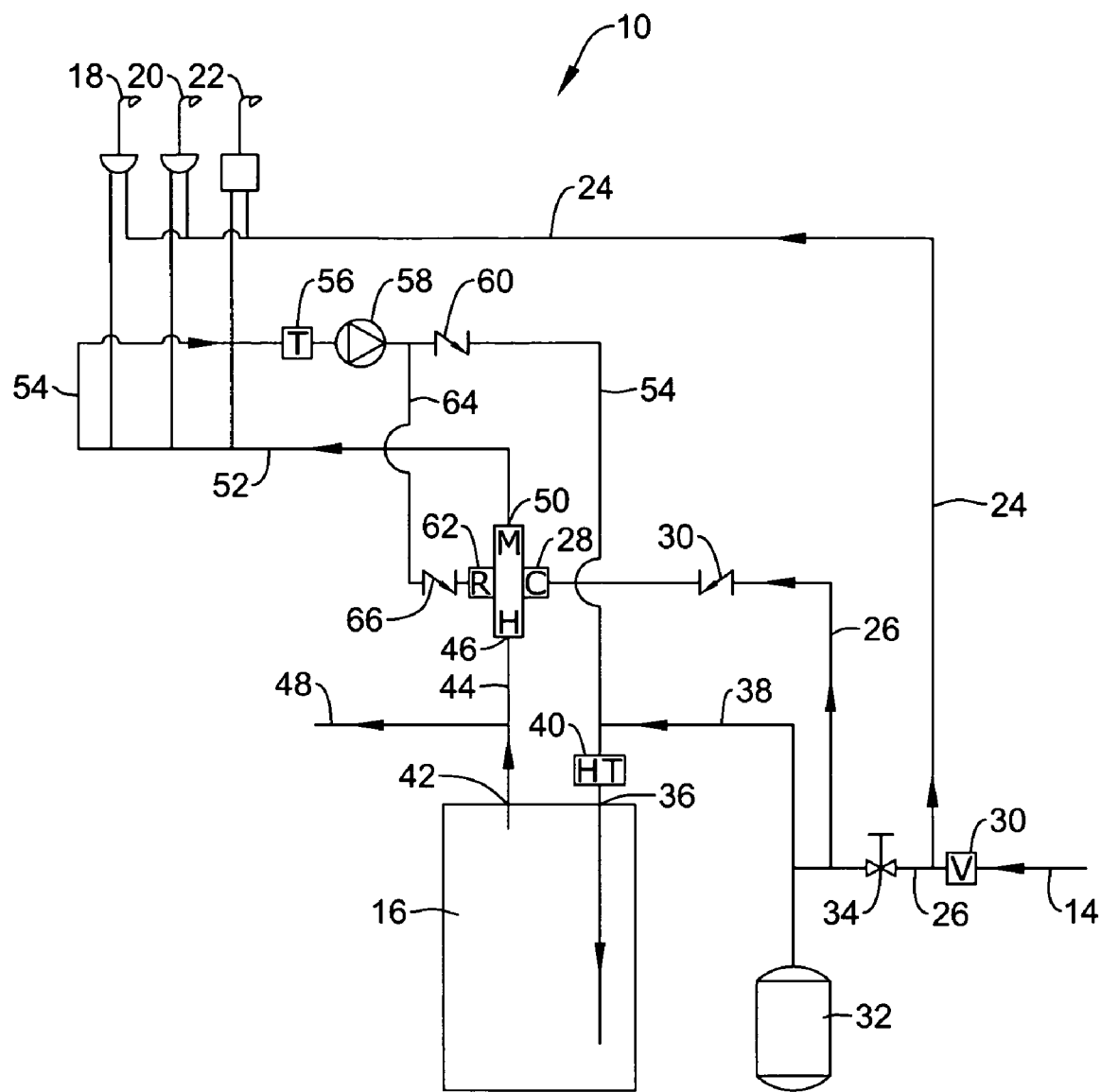
FIG. 2 is a schematic view showing the illustrative thermostatic mixing valve of FIG. 1 equipped with a recirculation inlet.

FIG. 2 is a schematic view showing the illustrative thermostatic mixing valve 12 of FIG. 1 equipped with an optional recirculation inlet. As shown in FIG. 2, a recirculation pipe or conduit 54 in fluid communication with pipe or conduit 52 can be provided to permit the recirculation of mixed water back into the inlet port 36 of the water heater 16. A thermostat 56 and pump 58 operatively coupled to the recirculation pipe or conduit 54 downstream of the fixture units 18,20,22 can be provided to intermittently draw fluid back into the water heater 16, as needed. The thermostat 56 can be set to ensure that the temperature within the recirculation pipe or conduit 54 remains at a certain temperature or range of temperatures, turning on the recirculation pump 58 periodically when the temperature therein reaches a certain minimum threshold temperature. If, desired, a check valve 60 installed downstream of the pump 58 can be provided to prevent the backflow of water into the pump 58.

As can be further seen in FIG. 2, the mixing valve 12 may also include a recirculation inlet 62 in fluid communication with a return pipe or conduit 64 that can be used to recirculate tempered water discharged from the mix water outlet 50 back into the mixing valve 12. The return pipe or conduit 64 can be connected to the recirculation pipe or conduit 54 at a location downstream of the pump 58, and can include a check valve 66 to prevent the backflow of water from the mixing valve 12 into the return pipe or conduit 64. In use, the ability to recirculate water through the mixing valve 12 prevents cold water from building up within the mixed water pipe or conduit 52 during periods of nonuse, or when the demand for mixed water is low. Such recirculation feature within the mixing valve 12 can also be used to overcome the characteristic of many thermostatic mixing valves to overshoot the desired mixing temperature after relatively long periods of nonuse (e.g. overnight) or shortly after a previous draw.

Figure 3:
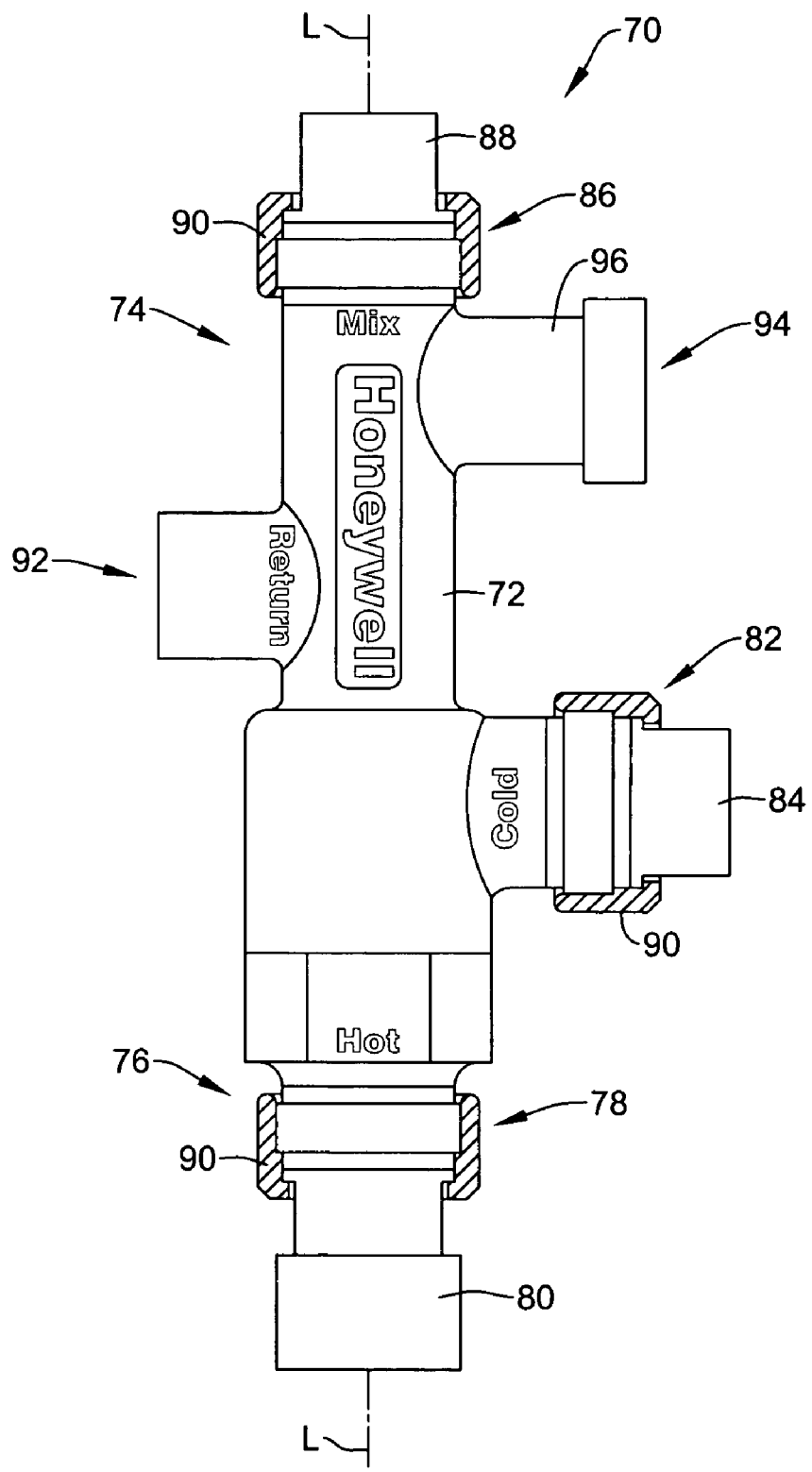
FIG. 3 is a partial perspective view showing an illustrative thermostatic mixing valve in accordance with an exemplary embodiment of the present invention.

Turning now to FIG. 3, a partial perspective view showing an illustrative thermostatic mixing valve 70 in accordance with an exemplary embodiment of the present invention will now be described. As shown in FIG. 3, the mixing valve 70 may include an elongated body 72 having an upper section 74, a lower section 76, and a general longitudinal axis L that extends vertically along the axial length of the valve body 72.

A hot fluid inlet 78 of the valve body 72 can be configured to receive fluid at an elevated temperature from a water heater, boiler, or other suitable heating source, and can include a tailpiece fitting 80 or other suitable connection means for connecting the hot fluid inlet 78 to the supply of hot fluid. In similar fashion, a cold fluid inlet 82 of the valve body 72 can be configured to receive cold fluid from a cold water supply, and can include a tailpiece fitting 84 for connecting the cold fluid inlet 82 to the supply of cold fluid. A mix fluid outlet 86 of the valve body 72 can be configured to output tempered fluid to the hot water piping of a building or other such structure, and can include a tailpiece fitting 88 similar to that provided for the hot and cold fluid inlets 78,82. The tailpiece fittings 80,84,88 may each comprise a union sweat fitting, threaded fitting (e.g. NPT, NPS, etc.), compression fitting, and/or PEX fitting that can be utilized to connect the various inlets and outlets of the mixing valve 70 to the other components of the system. A threaded coupling 90 can be utilized to secure each of the tailpiece fittings 80,84,88 to the valve body 72, if desired.

As can be further seen in FIG. 3, the mixing valve 70 may have a vertical, in-line configuration wherein the hot fluid inlet 78 and mix fluid outlet 86 are vertically and axially aligned along the longitudinal axis L of the valve body 72, allowing hot fluid entering the hot fluid inlet 78 to travel upwardly through the mixing valve 70 in a substantially vertical direction towards the mix fluid outlet 86. The cold water inlet 82, in turn, may enter the valve body 72 at an angle orthogonal to the longitudinal axis L to permit direct access to the cold water inlet port provided on many conventional water heaters. In the illustrative embodiment of FIG. 3, a recirculation inlet 92 is further shown entering the valve body 72 at an angle orthogonal to the longitudinal axis L, but in a direction opposite that of the cold water inlet 82.

A temperature selection device 94 disposed within a side housing 96 of the valve body 72 can be provided to adjust the temperature of fluid discharged from the mixing valve 70. In residential water heating systems, for example, the temperature selection device 94 can be utilized to adjust the mixing valve 70 to output tempered water at a set-point temperature in the range of about 80° F. to 140° F., and more specifically 90° F. to 130° F., although other set-point temperatures are possible. The set-point temperature selected by the temperature selection device 94 will typically vary based on the application, however.

Figure 4:
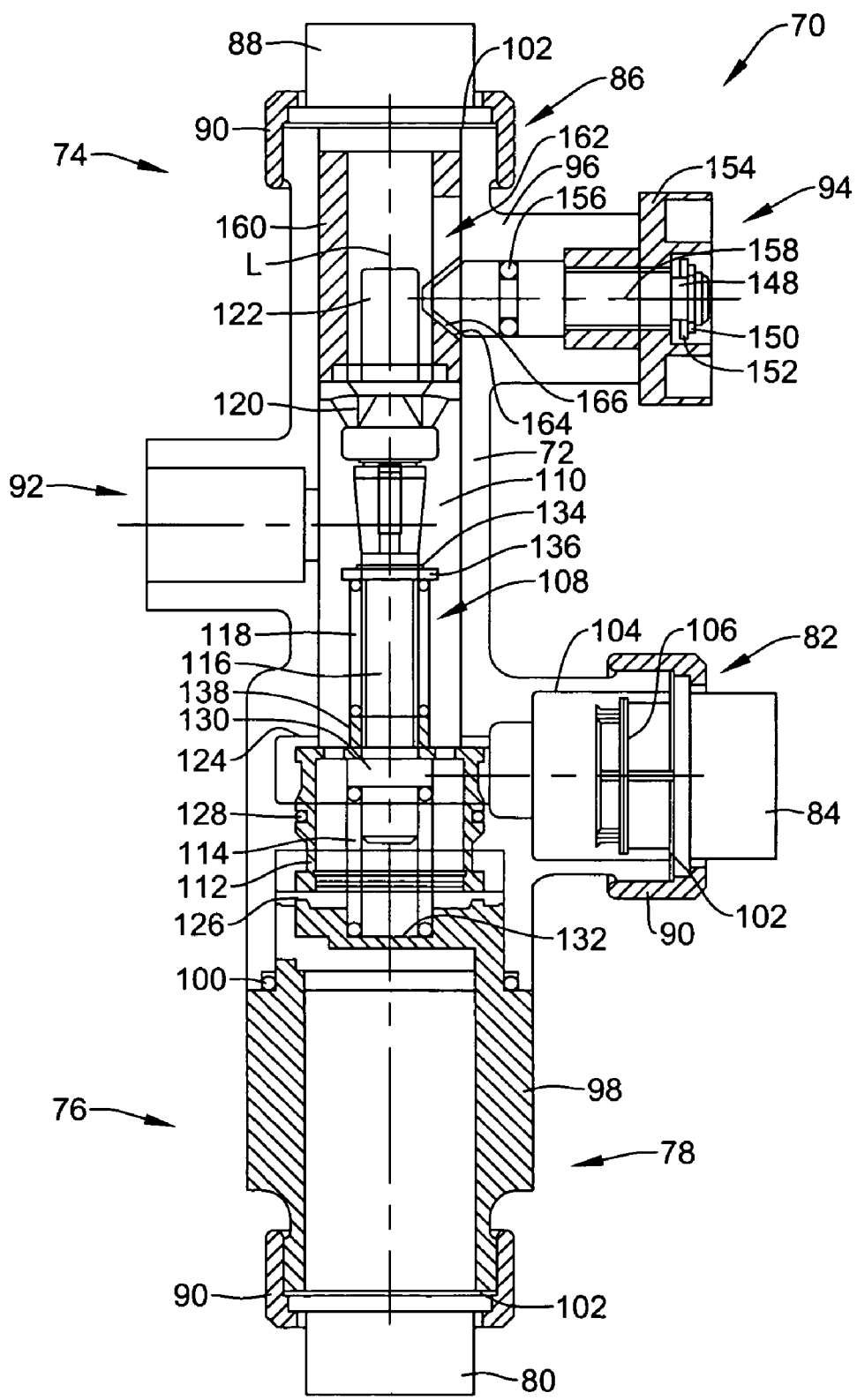
FIG. 4 is a cross-sectional view showing the interior structure of the illustrative mixing valve of FIG. 3 in greater detail.

FIG. 4 is a cross-sectional view showing the interior structure of the illustrative mixing valve 70 of FIG. 3 in greater detail. As shown in FIG. 4, the hot fluid inlet 78 of the valve body 72 may include an end cap 98 and gasket 100 adapted to frictionally secure the tailpiece fitting 80 to the valve body 72. The tailpiece fitting 80, in turn, can be secured to an interior portion of the end cap 98 using the threaded coupling 90 and a gasket 102. Such configuration permits the tailpiece fitting 80 to be separately connected to the pipe or conduit supplying hot water from the water heater, and then inserted into the end cap 98 and attached thereto using the threaded coupling 90 and gasket 102. A similar set of gaskets 102 can be provided for connecting the tailpiece fittings 84,88 to the cold fluid inlet 82 and mix fluid outlet 86, if desired.

The cold fluid inlet 82 of the valve body 72 may include a side housing 104 having an interior section adapted to receive the tailpiece fitting 84. In certain embodiments, the side housing 104 may further include an internal check valve 106 configured to prevent backflow of fluid through the cold fluid inlet 82. While the check valve 106 may be positioned within the side housing 104 of the cold fluid inlet 82, as shown, other embodiments are contemplated wherein the check valve is placed at other locations external to the mixing valve 70.

As can be further seen in FIG. 4, the mixing valve 70 may include a fluid flow regulator 108 for adjusting the flow of cold and hot fluid injected into a mixing chamber 110 of the valve body 72. The fluid flow regulator 108 may include a spool 112, a modulating spring element 114, a piston stem 116, a bypass spring 118, a diffuser 120, and a temperature sensitive (e.g. wax filled) thermal element 122.

The spool 112 may be movably disposed between a first inner surface 124 of valve body 72 and a second inner surface 126 of the valve body 72 in a direction substantially aligned with the general longitudinal axis L. The distance between the first inner surface 124 of the valve body 72 and the second inner surface 126 thereof is referred to as the spool stroke, and is typically greater than the overall axial length of the spool 112 to permit the spool 112 to travel up and down within the interior of the valve body 72. An O-ring 128 can be provided to frictionally support the spool 112 within the valve body 72 as the spool 112 is actuated between the first and second inner surfaces 124,126. In some embodiments, the spool 112, valve body 72 as well as other internal components of the mixing valve 70 can be coated with a layer of Teflon® or other suitable lubricous material to facilitate movement of the spool 112 within the valve body 72 and/or to prevent mineral buildup from occurring within the mixing valve 70.

The spring element 114 can be used to bias the spool 112 towards the first inner surface 124 of the valve body 72, and can be operatively coupled at a first (i.e. upper) end to a hub 130 coupled to the lower end of the piston stem 116, and at a second (i.e. lower) end to a portion 132 of the end cap 98. The bypass spring 118 can be provided to further load the spool 112 and spring element 114, and can be coupled at a first (i.e. upper) end to a retain ring 134 and washer 136, and at a second (i.e. lower) end to an upwardly extending portion 138 of the spool 112. The spring element 114 and bypass spring 118 can be operatively coupled to the piston stem 116, which can be configured to move within the valve body 72 as a result of the axial expansion and contraction of the thermal element 122 in response to the temperature of fluid contained within the mixing chamber 110.

The diffuser 120 can be configured to mix or blend hot and cold fluid contained within the mixing chamber 110 prior to passing upwardly beyond the thermal element 122 and out the mix fluid outlet 86. As shown in greater detail in FIGS. 5-6, the diffuser 120 may include a peripheral wall 140, a number of fins 142 projecting inwardly from the peripheral wall 140 toward the center of the diffuser 120, and an annular plate 144 projecting inwardly from the peripheral wall 140 to form an internal aperture 146. The aperture 146 will typically have a diameter that is slightly larger than the outer dimension of the thermal element 122. The diffuser 120 may be formed as a separate element from the piston stem 116, as shown, for example, in FIGS. 5-6, or can be formed integral therewith from a single piece of material. In certain embodiments, for example, the piston stem 116 and diffuser 120 can be formed from a single composite piece of polypropylene loaded with fiberglass, although other configurations are possible.

Referring back to FIG. 4, the temperature selection device 94 may include an adjustment mechanism rotatably disposed within the side housing 96 of the valve body 72. In certain embodiments, the adjustment mechanism may include an adjusting screw 148, a retaining ring 150, and a washer 152 inset within an end cap 154 of the side housing 96, allowing the user to adjust the temperature of fluid discharged from the mixing valve 70 using an Allen wrench, screwdriver, or other such tool. An O-ring 156 disposed within the interior of the side housing 96 can be configured to provide a fluidic seal for the adjustment screw 148 while permitting axial movement of the screw 148 along an axis 158 orthogonal to the longitudinal axis L of the valve body 72.

A collar 160 movably disposed within the mixing chamber 110 in a direction axially along the longitudinal axis L of the valve body 72 can be configured to engage the fluid flow regulator 108 for adjusting the nominal positioning of the spool 112 within the valve body 72. The collar 160 may define a side opening 162 having an angled surface 164 adapted to engage a tapered section 166 of the adjustment screw 148. In use, the temperature selection device 94 is operable by turning the adjustment screw 148 in either a clockwise or counterclockwise direction within the side housing 96, causing the tapered section 166 of the adjustment screw 148 to move the collar 160 in either an upward or downward direction, respectively, within the valve body 72. Rotation of the adjustment screw 148 in a clockwise direction, for example, causes the tapered section 166 to push the collar 160 in a downward direction within the valve body 72, thereby increasing the amount of compression within the spring element 114 and moving the spool 112 further towards the second inner surface 126 of the valve body 72. Conversely, rotation of the adjustment screw 148 in a counterclockwise direction causes the tapered section 168 to move the collar 160 in an upward direction within the valve body 72, thereby decreasing the amount of compression within the spring element 114 and moving the spool 112 further towards the first inner surface 124 of the valve body 72. Such adjustment of the distance of the spool 112 between the first and second inner surfaces 124,126 results in a change in the ratio of hot and cold water mixed within the mixing valve 72, resulting in a change in the temperature of fluid discharged from the mixing valve 70.

Figure 7:
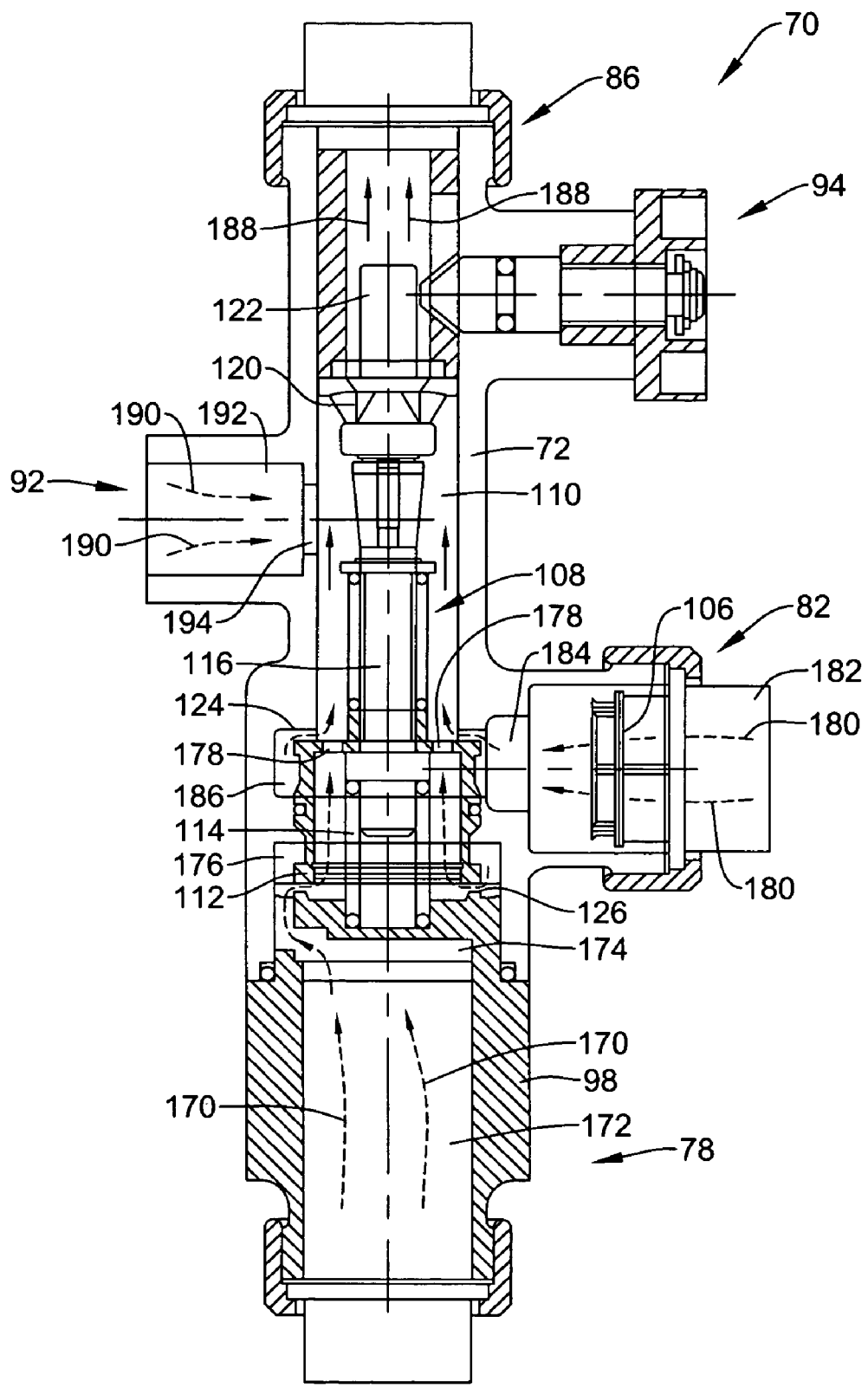
FIG. 7 is a cross-sectional view showing the fluid flow path of hot, cold and recirculated fluid through the illustrative thermostatic mixing valve of FIGS. 3-4.

Turning now to FIG. 7, the operation of the illustrative mixing valve 70 of FIGS. 3-4 will now be described in greater detail. As indicated by dashed lines 170 in FIG. 7, hot fluid enters the hot fluid inlet 78 of the valve body 72 through an external hot fluid port 172, an internal hot fluid port 174, and then into a hot fluid chamber comprising a first annular distribution groove 176 radially disposed about the exterior of the spool 112. Once disposed within the first annular distribution groove 176, and when spool 112 is located a distance away from the second inner surface 126, the hot fluid is allowed to pass into the interior of the spool 112 and through a series of radial grooves 178 in fluid communication with the mixing chamber 110.

As is further indicated by a second set of dashed lines 180, cold fluid enters the cold fluid inlet 82 of the valve body 72 through an external cold fluid port 182, an internal cold port 184, and then into a cold fluid chamber comprising a second annular distribution groove 186 radially disposed about the spool 112. Once disposed within the second annular distribution groove 186, and when the spool 112 is located a distance away from the first inner surface 124, the cold fluid is allowed to pass around the exterior of the spool 112 and into the mixing chamber 110 with the hot fluid.

Once the cold and hot fluid enter the mixing chamber 110, it is then passed through the diffuser 120, which can be configured to impart rotation to the fluid flow causing it to rotate within the mixing chamber 110. When this occurs, the diffuser 120 acts to pull the fluid toward the mix fluid outlet 86 by forcing it through the internal aperture 146, allowing a more accurate sensing of the true average temperature of the fluid as it passes upwardly beyond thermal element 122. As indicated by a set of solid arrows 188 in FIG. 7, the mixed (i.e. tempered) fluid is then discharged from the mixing valve 70 through the mix fluid outlet 86.

In those embodiments employing a recirculation fluid inlet 92, recirculated fluid, indicated generally by the set of dashed arrows 190 in FIG. 7, may enter the valve body 72 through an external recirculation inlet port 192, an internal recirculation inlet port 194, and into the mixing chamber 110 where it is then mixed with the hot and cold fluid, as discussed above. If desired, the mixing valve 70 can be equipped with a threaded hex plug, shut-off valve, or other suitable mechanism for stopping or limiting the flow or recirculation fluid into the valve body 72. Alternatively, and in some embodiments, the mixing valve 70 can be provided without the recirculation inlet 92, obviating the need for a separate plug or valve. If desired, an internal check valve (not shown) can be provided within the recirculation fluid inlet 92 to prevent backflow of recirculated fluid through the recirculation fluid inlet 92.

Operation of the fluid flow regulator 108 will now be described. When the temperature of cold fluid supplied to the mixing valve 70 decreases and the thermal element 122 axially expands within the mixing chamber 110, the piston stem 116 is pushed downwardly against the spring element 114, causing the spool 112 to move away from first (i.e. upper) inner surface 124 of the valve body 72 and toward the second (i.e. lower) inner surface 126 thereof. As the spool 112 moves towards the second inner surface 126, the size of the gap between the second inner surface 126 and the spool 112 decreases, thereby decreasing the amount of hot fluid that is allowed to pass through the radial openings 178 and into the mixing chamber 110. At the same time, as the spool 112 is moved towards the second inner surface 126, the width of the cold fluid path from the second annular distribution groove 186 to the mixing chamber 110 increases, thereby increasing the amount of cold fluid that is allowed to pass into mixing chamber 110. The resulting mix of fluid discharged through the mix fluid outlet 86 thus has a temperature that is closer to the desired temperature set by the temperature selection device 94. As the temperature of the mixed fluid decreases, the thermal element 122 contracts, causing the piston stem 116 to move upwardly and return to its steady-state position.

When the temperature of the hot fluid supplied to the mixing valve 70 decreases and the thermal element 122 axially contracts within the mixing chamber 110, the opposite action occurs in the fluid flow regulator 108, causing the piston stem 116 to move upwardly by the force of the spring element 114 and move the spool 112 away the second inner surface 126 of the valve body 72 toward the first inner surface 124 thereof. As the spool 112 moves towards the first inner surface 124, the size of the gap between the second inner surface 126 and the spool 112 increases, thereby increasing the amount of hot fluid that is allowed to pass through the radial openings 178 and into the mixing chamber 110. At the same time, as the spool 112 is moved towards the first inner surface 124, the width of the cold fluid path from the second annular distribution groove 186 to the mixing chamber 110 decreases, thereby decreasing the amount of cold fluid that is allowed to pass into the mixing chamber 110. The resulting mix of fluid discharged through the mix outlet port 86 thus has a temperature that is closer to the desired temperature set by the thermal selection device 94. As the temperature of the mixed fluid increases, the thermal element 122 expands, causing the piston stem 116 to move downwardly and return to its steady-state position.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. A thermostatic mixing valve, comprising:
an elongated valve body defining a cold fluid inlet that is configured to be connected in fluid communication with a cold fluid source, a hot fluid inlet that is configured to be connected in fluid communication with a hot fluid source, and a mix fluid outlet in fluid communication with the cold fluid inlet, the hot fluid inlet, and a mixing chamber disposed within the valve body, said valve body having an in-line configuration wherein the hot fluid inlet, mixing chamber, and mix fluid outlet are substantially axially aligned along a longitudinal axis of the elongated valve body;
a fluid flow regulator disposed along the longitudinal axis within the elongated valve body for adjusting the relative flow of cold and hot fluid injected into the mixing chamber; and
temperature selection means accessible from outside of the elongated valve body for allowing a user to adjust the temperature of fluid contained within the mixing chamber, wherein the temperature selection means is configured to engage the fluid flow regulator to move the relative position of the fluid flow regulator coextensively along the longitudinal axis of the elongated valve body.

2. The thermostatic mixing valve of claim 1, wherein the fluid flow regulator includes:
a spool movably disposed between a first inner surface of the valve body and a second inner surface of the valve body;
a spring element configured to bias the spool towards the first surface of the valve body;
a piston stem movably disposed within the valve body and operatively coupled to the spool and spring element; and
a thermal element axially disposed within the mixing chamber and operatively coupled to the piston stem, said thermal element configured to thermally expand or contract and engage the piston stem axially within the valve body in response to the temperature of fluid contained within the mixing chamber.

3. The thermostatic mixing valve of claim 2, wherein the valve body defines a hot fluid chamber in fluid communication with the hot fluid inlet, said hot fluid chamber comprising a first annular distribution groove radially disposed about the spool.

4. The thermostatic mixing valve of claim 3, wherein the spool includes an aperture for receiving hot fluid from the first annular distribution groove.

5. The thermostatic mixing valve of claim 3, wherein the valve body further defines a cold fluid chamber in fluid communication with the cold fluid inlet, said cold fluid chamber comprising a second annular distribution groove radially disposed about the spool and spaced from the first annular distribution groove.

6. The thermostatic mixing valve of claim 2, wherein the thermal element comprises a wax filled thermal element.

7. The thermostatic mixing valve of claim 2, wherein the fluid flow regulator further includes a diffuser configured to agitate fluid contained within the mixing chamber.

8. The thermostatic mixing valve of claim 7, wherein the diffuser includes a peripheral wall, a number of fins projecting inwardly from the peripheral wall, and an annular plate projecting inwardly from the peripheral wall and defining an aperture.

9. The thermostatic mixing valve of claim 2, wherein the fluid flow regulator further includes a bypass spring.

10. The thermostatic mixing valve of claim 1, wherein the valve body further includes a recirculation inlet.

11. The thermostatic mixing valve of claim 1, wherein the cold fluid inlet enters the mixing valve at an angle orthogonal to the longitudinal axis of the elongated valve body.

12. The thermostatic mixing valve of claim 1, wherein the cold fluid inlet includes a check valve.

13. The thermostatic mixing valve of claim 1, wherein the cold fluid inlet, hot fluid inlet, and mix fluid outlet each include a tailpiece fitting.

14. The thermostatic mixing valve of claim 1, wherein the hot fluid inlet is located at a lower section of the valve body.

15. The thermostatic mixing valve of claim 1, wherein the mix fluid outlet is located at an upper section of the valve body.

16. The thermostatic mixing valve of claim 1, wherein said temperature selection means for adjusting the temperature of fluid contained within the mixing chamber includes:
an adjustment mechanism rotatably disposed within a side housing of the valve body; and
a collar movably disposed within the valve body in a direction axially along the longitudinal axis of the valve body, said collar being operatively coupled to the fluid flow regulator for adjusting the position of the fluid flow regulator within the valve body, the collar including a side opening having an angled surface configured to engage a tapered section of said adjustment mechanism.

17. A thermostatic mixing valve, comprising:
an elongated valve body extending generally along a longitudinal axis and defining a cold fluid inlet that is configured to be connected in fluid communication with a cold fluid source, a hot fluid inlet that is configured to be connected in fluid communication with a hot fluid source, and a mix fluid outlet in fluid communication with the cold fluid inlet, the hot fluid inlet, and a mixing chamber disposed within the valve body, said cold fluid inlet including an internal check valve configured to prevent backflow of fluid through the cold fluid inlet;
a fluid flow regulator for adjusting the relative flow of cold and hot fluid injected into the mixing chamber; and
a temperature selector accessible from outside of the elongated valve body for allowing a user to adjust the temperature of fluid contained within the mixing chamber, wherein the temperature selector, in response to a user's adjustment, adjusts the relative position of the fluid flow regulator coextensively along the longitudinal axis of the elongated valve body, the relative position of the fluid flow regulator along the longitudinal axis of the elongated valve body changing a fluid passageway dimension of both the cold and the hot fluid flows.

18. A thermostatic mixing valve, comprising:
an elongated valve body defining a cold fluid inlet that is adapted to be connected in fluid communication with a cold fluid source, a hot fluid inlet that is adapted to be connected in fluid communication with a hot fluid source, and a mix fluid outlet in fluid communication with the cold fluid inlet, the hot fluid inlet, and a mixing chamber disposed within the valve body, said valve body having an in-line configuration wherein the hot fluid inlet, mixing chamber, and mix fluid outlet are substantially axially aligned along a longitudinal axis of the elongated valve body;
a fluid flow regulator for adjusting the flow of cold and hot fluid injected into the mixing chamber; and a temperature selection device for adjusting the temperature of fluid contained within the mixing chamber, said temperature selection device including an adjustment mechanism rotatably disposed within a side housing of the valve body, and a collar movably disposed within the valve body in a direction axially along the longitudinal axis of the valve body, the collar including an angled surface adapted to engage a tapered section of said adjustment mechanism, the angled surface being at an angle that is supplementary or substantially supplementary to the angle of the tapered section of said adjustment mechanism, wherein movement of the adjustment mechanism causes movement of the collar in the direction axially along the longitudinal axis of the valve body.

19. A thermostatic mixing valve, comprising:

an elongated valve body generally extending lengthwise along a longitudinal axis, the valve body having a cold fluid inlet, a hot fluid inlet, and a mix fluid outlet fluidly coupled to a mixing chamber;

the cold fluid inlet for passing a cold fluid to a cold fluid passageway, the hot fluid inlet for passing a hot fluid to a hot fluid passageway, and the mix fluid output for passing a mixed fluid from the mixing chamber;

the cold fluid inlet enters the elongated valve body at an angle that is orthogonal or substantially orthogonal to the longitudinal axis of the valve body;

the hot fluid inlet enters the elongated valve body at an angle that is orthogonal or substantially orthogonal to the cold fluid inlet;

a fluid flow regulator for simultaneously changing a dimension of both the cold fluid and the hot fluid passageways by moving at least part of the fluid flow regulator coextensively along the longitudinal axis of the valve body; and a temperature selector accessible from outside of the elongated valve body for allowing a user to adjust the position of the fluid flow regulator along the longitudinal axis of the valve body to thereby adjust the temperature of the mixed fluid.

20. A thermostatic mixing valve, comprising:

an elongated valve body generally extending lengthwise along a longitudinal axis, the valve body having a cold fluid inlet, a hot fluid inlet, and a mix fluid outlet fluidly coupled to a mixing chamber;

the cold fluid inlet for passing a cold fluid to a cold fluid passageway, the hot fluid inlet for passing a hot fluid to a hot fluid passageway, and the mix fluid output for passing a mixed fluid from the mixing chamber;

a fluid flow regulator for simultaneously changing a dimension of both the cold fluid passageway and the hot fluid passageway by moving the fluid flow regulator coextensively with the longitudinal axis of the valve body;

a temperature selector accessible from outside of the elongated valve body for allowing a user to adjust the position of the fluid flow regulator along the longitudinal axis of the elongated valve body to thereby adjust the temperature of the mixed fluid;

the mix fluid output being fluidly coupled to a mixed fluid passageway that delivers the mixed fluid from the fluid flow regulator to the mixed fluid output;

at least a portion of the hot fluid passageway extending along an axis that is parallel or substantially parallel to the longitudinal axis of the elongated valve body; and at least a portion of the mixed fluid passageway extending along an axis that is parallel or substantially parallel to the longitudinal axis of the elongated valve body.

21. The thermostatic mixing valve of claim 20 wherein the axis of the portion of the mixed fluid passageway that is parallel or substantially parallel to the longitudinal axis of the elongated valve body is coextensive with the longitudinal axis of the elongated valve body.

22. The thermostatic mixing valve of claim 20 wherein the portion of the mixed fluid passageway that is parallel or substantially parallel to the longitudinal axis of the elongated valve body is at least substantially axially aligned with the mixing chamber.

23. The thermostatic mixing valve of claim 22 wherein:

the cold fluid inlet enters the elongated valve body at an angle that is orthogonal or substantially orthogonal to the longitudinal axis of the valve body; and the hot fluid inlet enters the elongated valve body at an angle that is orthogonal or substantially orthogonal to the cold fluid inlet.

* * * * *